US009357810B2

(12) United States Patent
Garneau

(10) Patent No.: US 9,357,810 B2
(45) Date of Patent: Jun. 7, 2016

(54) CYCLIST HELMET

(75) Inventor: Louis Garneau, St-Augustin-de-Desmaures (CA)

(73) Assignee: LOUIS GARNEAU SPORTS INC. (CA)

( * ) Notice: Subject to any disclaimer, the term of this patent is extended or adjusted under 35 U.S.C. 154(b) by 276 days.

(21) Appl. No.: 13/696,850

(22) PCT Filed: May 11, 2011

(86) PCT No.: PCT/CA2011/050290
§ 371 (c)(1),
(2), (4) Date: Nov. 8, 2012

(87) PCT Pub. No.: WO2011/140656
PCT Pub. Date: Nov. 17, 2011

(65) Prior Publication Data
US 2013/0055488 A1    Mar. 7, 2013

Related U.S. Application Data

(60) Provisional application No. 61/334,820, filed on May 14, 2010.

(51) Int. Cl.
A42B 3/00 (2006.01)
A42B 1/00 (2006.01)
A42B 3/06 (2006.01)
A42B 3/12 (2006.01)
A42B 3/28 (2006.01)
B29L 31/48 (2006.01)

(52) U.S. Cl.
CPC .............. *A42B 3/066* (2013.01); *A42B 3/124* (2013.01); *A42B 3/28* (2013.01); *A42B 3/068* (2013.01); *B29L 2031/4821* (2013.01)

(58) Field of Classification Search
CPC .......... A42B 3/066; A42B 3/28; A42B 3/124; A42B 3/065; A42B 3/068; B29L 2031/4821
USPC ................ 2/425, 411, 171.3, 182.2, 414, 415
See application file for complete search history.

(56) References Cited

U.S. PATENT DOCUMENTS 3,500,473 A * 3/1970 Marchello .......................... 2/414
4,539,715 A    9/1985 Clement
(Continued)

FOREIGN PATENT DOCUMENTS

| CA | 105095 | 11/2004 |
| CA | 121281 | 3/2008 |
| WO | 9846095 A2 | 10/1998 |

OTHER PUBLICATIONS

International Search Report; International Application No. PCT/CA2011/050290, International Filing Date May 11, 2011; Mail date Aug. 11, 2011.

*Primary Examiner* — Khoa Huynh
*Assistant Examiner* — Katharine Gracz
(74) *Attorney, Agent, or Firm* — Cantor Colburn LLP

(57) ABSTRACT

A bicycle helmet comprises a helmet body including a shock absorbing insert and an external shell overlying at least partially the shock absorbing insert. The shock absorbing insert and the external shell have a plurality of structural bridges interconnected with each other with ventilation openings extending therebetween, a majority of the structural bridges having elongated ridges protruding from a base section. The elongated ridges and the base sections of the external shell overlie a respective one of the elongated ridges and the base sections of the shock absorbing insert.

15 Claims, 6 Drawing Sheets

(56) References Cited

U.S. PATENT DOCUMENTS

| | | | |
|---|---|---|---|
| 5,119,516 A | 6/1992 | Broersma | |
| 6,332,228 B1 * | 12/2001 | Takahara | 2/422 |
| 6,694,529 B1 * | 2/2004 | Chiu | 2/411 |
| 7,069,601 B1 * | 7/2006 | Jacobsen | 2/421 |
| 2007/0000022 A1 * | 1/2007 | Jacobsen | 2/171 |

* cited by examiner

US 9,357,810 B2

CYCLIST HELMET

CROSS-REFERENCE TO RELATED APPLICATIONS

This application claims priority under 35USC §119(e) of U.S. provisional patent application 61/334,820 filed on May 14, 2010, the specification of which is hereby incorporated by reference.

TECHNICAL FIELD OF THE INVENTION

The technical field relates to protective headgear and, more particularly, to a helmet and a method for manufacture same.

BACKGROUND

Bicycle helmets must be designed to provide proper protection of the cyclist head from trauma injury following accidental impacting fall. They must also be relatively lightweight to avoid fatigue to the cyclist neck. There is thus always an optimum mix to be found between head protection and weight.

Conventional bicycle helmets are typically made of a layer of crushable material such as synthetic resin foam, extending over the wearers head to mitigate the force of an impact and an external shell attached to the layer of crushable material and increasing the impact strength (resistance to impact). It also serves as a structural support for the crushable material.

There is thus a need for a helmet design that provides the desired structural support and impact strength while reducing the overall weight of the helmet.

BRIEF SUMMARY OF THE INVENTION

It is therefore an aim of the present invention to address the above mentioned issues.

According to a general aspect, there is provided a bicycle helmet comprising a helmet body including a shock absorbing insert and an external shell superposed to and at least partially covering the shock absorbing insert, the helmet body having a plurality of structural bridges interconnected with each other with ventilation openings extending therebetween, a majority of the structural bridges having a base section with an elongated ridge protruding outwardly from the base section.

According to another general aspect, there is provided a method for manufacturing a bicycle helmet comprising: forming an external shell having a substantially convexoconcave shape and a plurality of interconnecting structural bridges with a majority of the interconnecting structural bridges having an elongated ridge extending outwardly from a base section and having an elongated cavity defined inwardly in the ridge; inserting the external shell in a bicycle helmet mold; and injecting a shock absorbing material in the mold with the external shell being superposed to the injected shock absorbing material and the shock absorbing material filling the elongated cavities.

According to a further general aspect, there is provided a bicycle helmet comprising: a helmet body including a shock absorbing insert having a plurality of structural bridges interconnected with each other with ventilation openings extending therebetween, a majority of the structural bridges having elongated ridges protruding from a base section; and an external shell overlying at least partially the shock absorbing insert and having a plurality of structural bridges interconnected with each other with ventilation openings extending therebetween, a majority of the structural bridges having elongated ridges protruding from a base section, the elongated ridges and the base sections of the external shell overlying a respective one of the elongated ridges and the base sections of the shock absorbing insert.

BRIEF DESCRIPTION OF THE DRAWINGS

It will be noted that throughout the appended drawings, like features are identified by like reference numerals.

DETAILED DESCRIPTION

Figure 1:
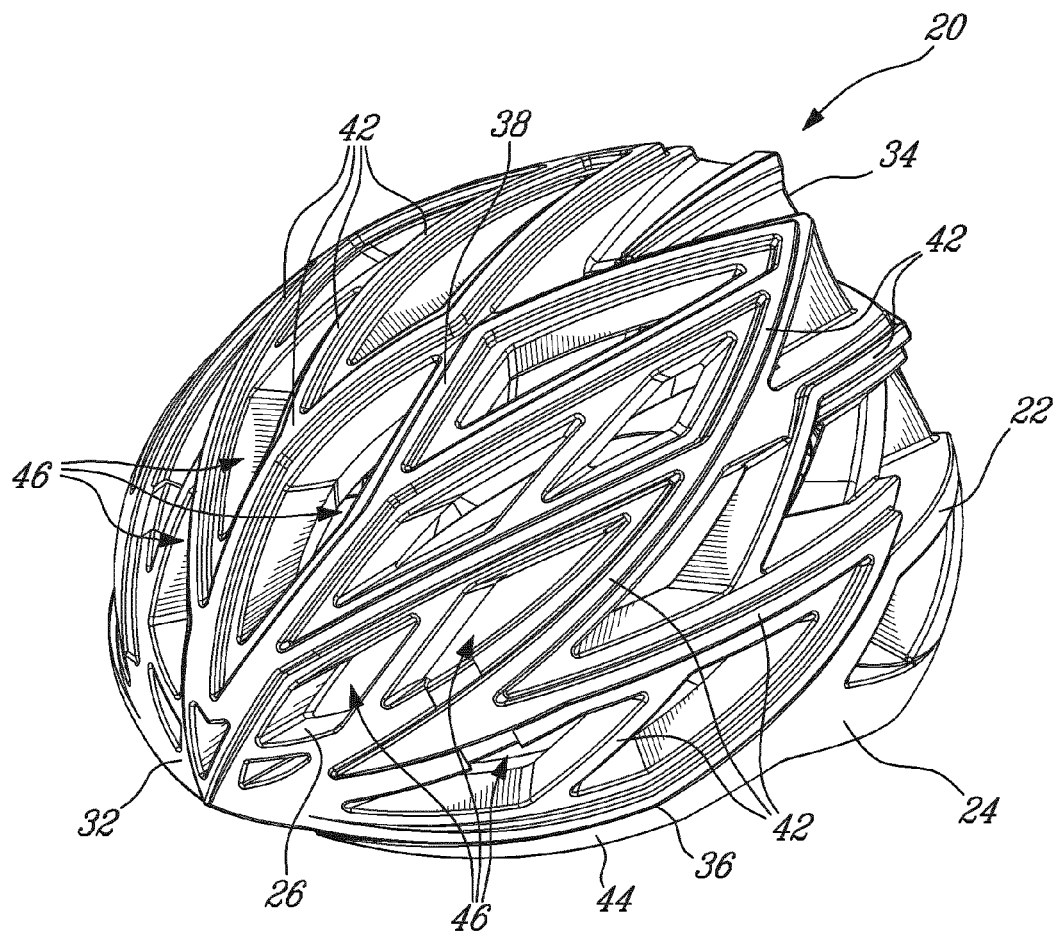
FIG. 1 is a perspective view of a protective helmet in accordance with an embodiment.
Figure 2:
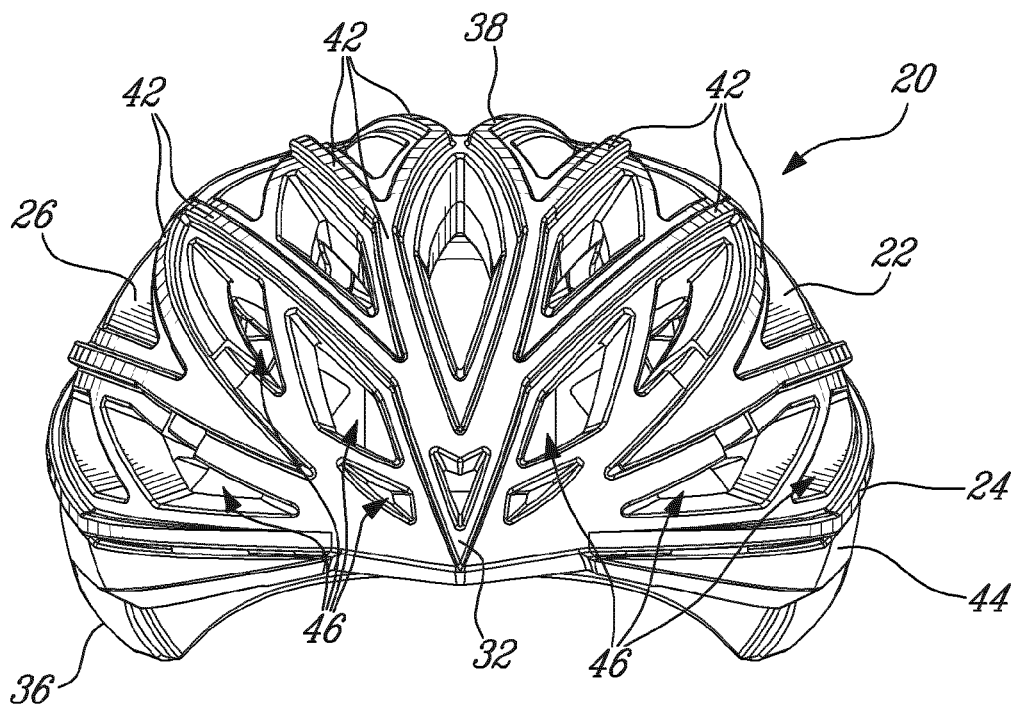
FIG. 2 is a front elevation view of the protective helmet shown in FIG. 1.
Figure 3:
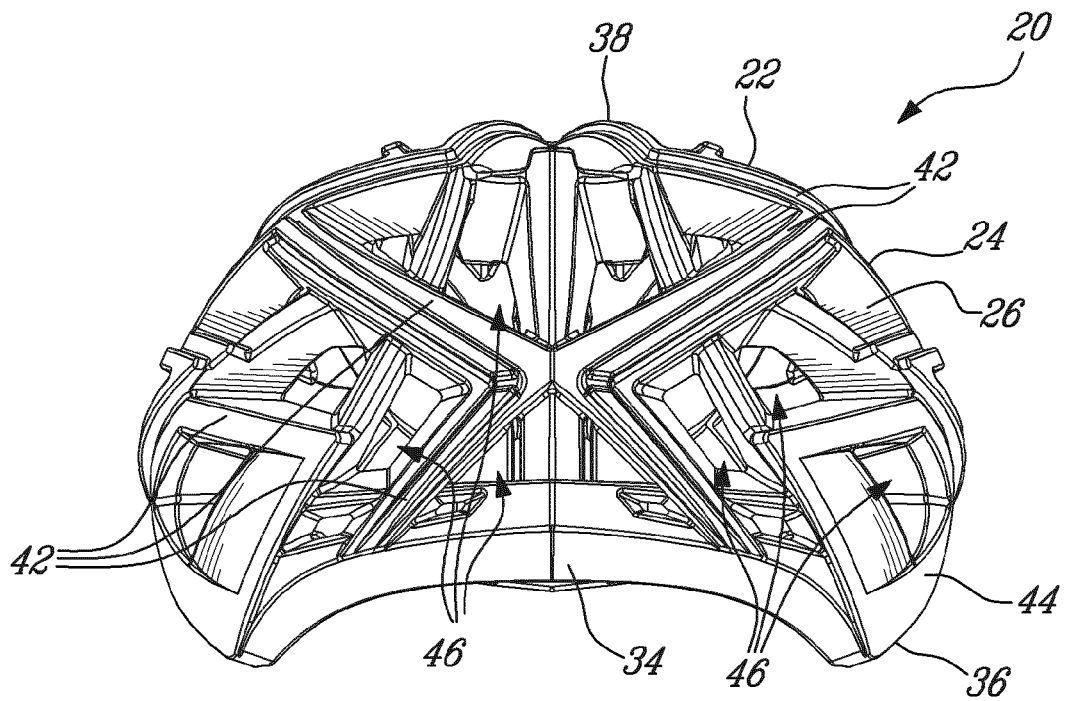
FIG. 3 is a rear elevation view of the protective helmet shown in FIG. 1.
Figure 4:
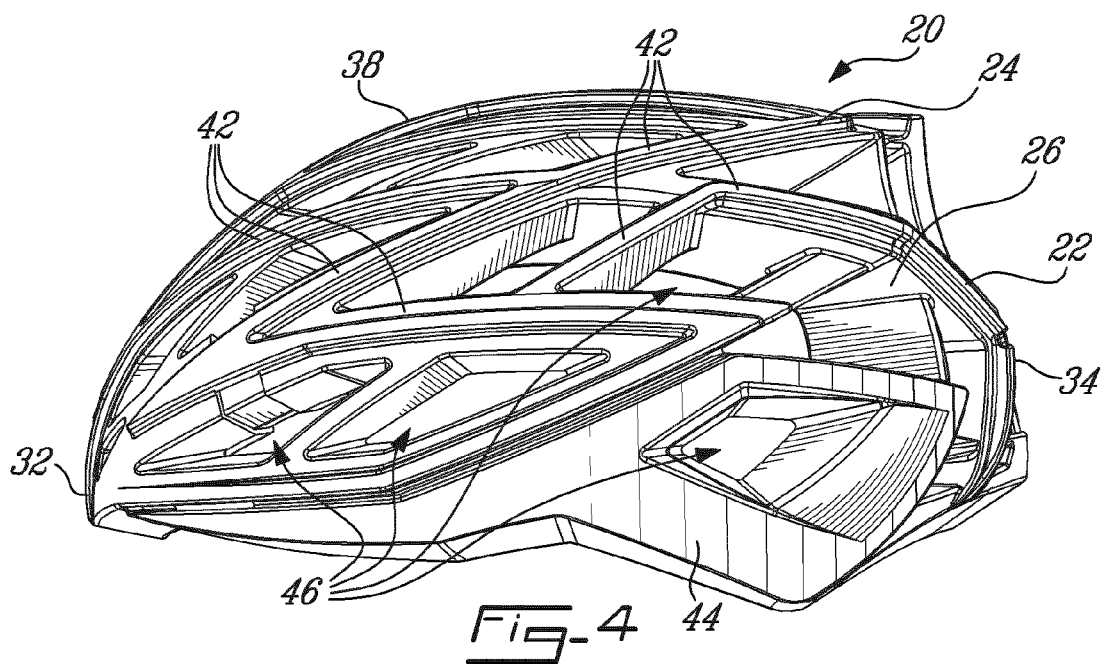
FIG. 4 is a side elevation view of the protective helmet shown in FIG. 1.
Figure 5:
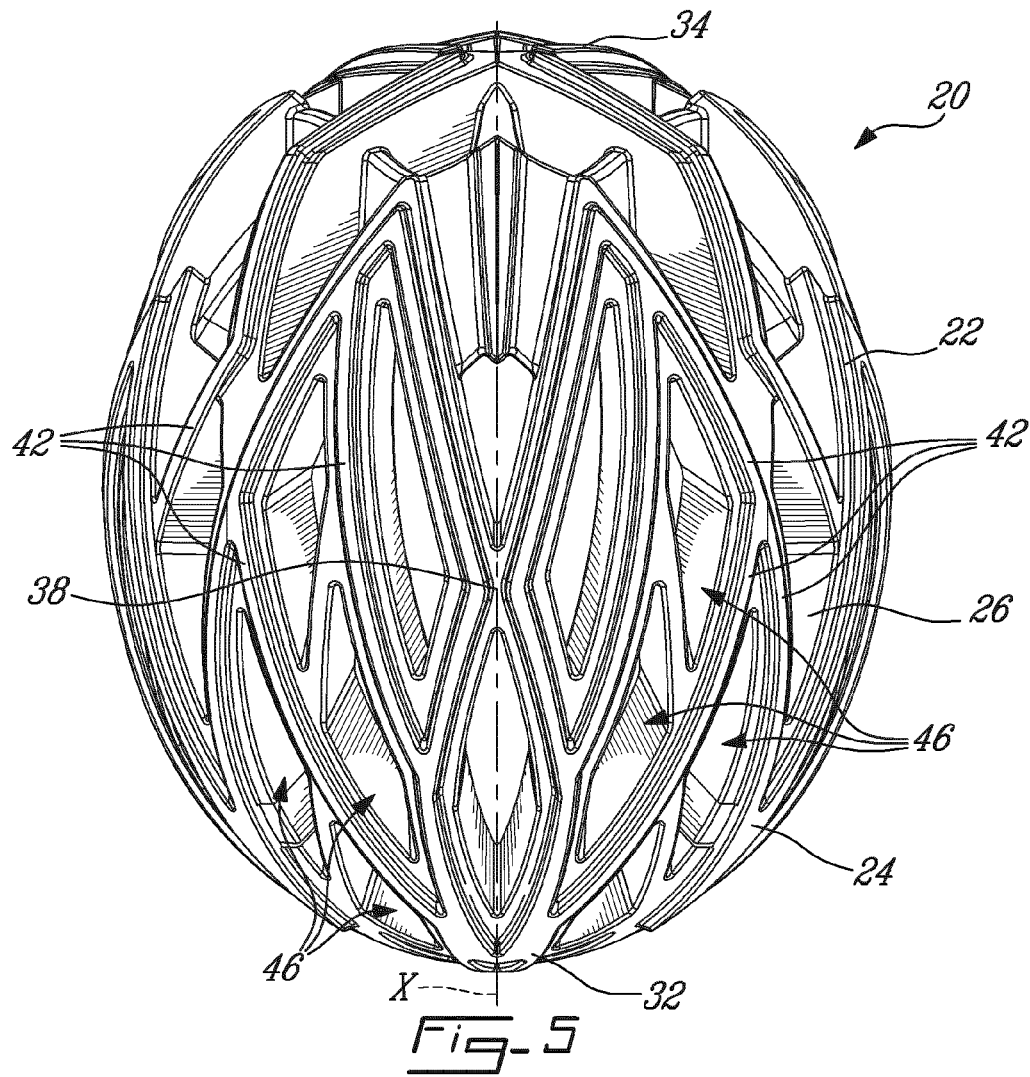
FIG. 5 is a top plan view of the protective helmet shown in FIG. 1.
Figure 6:
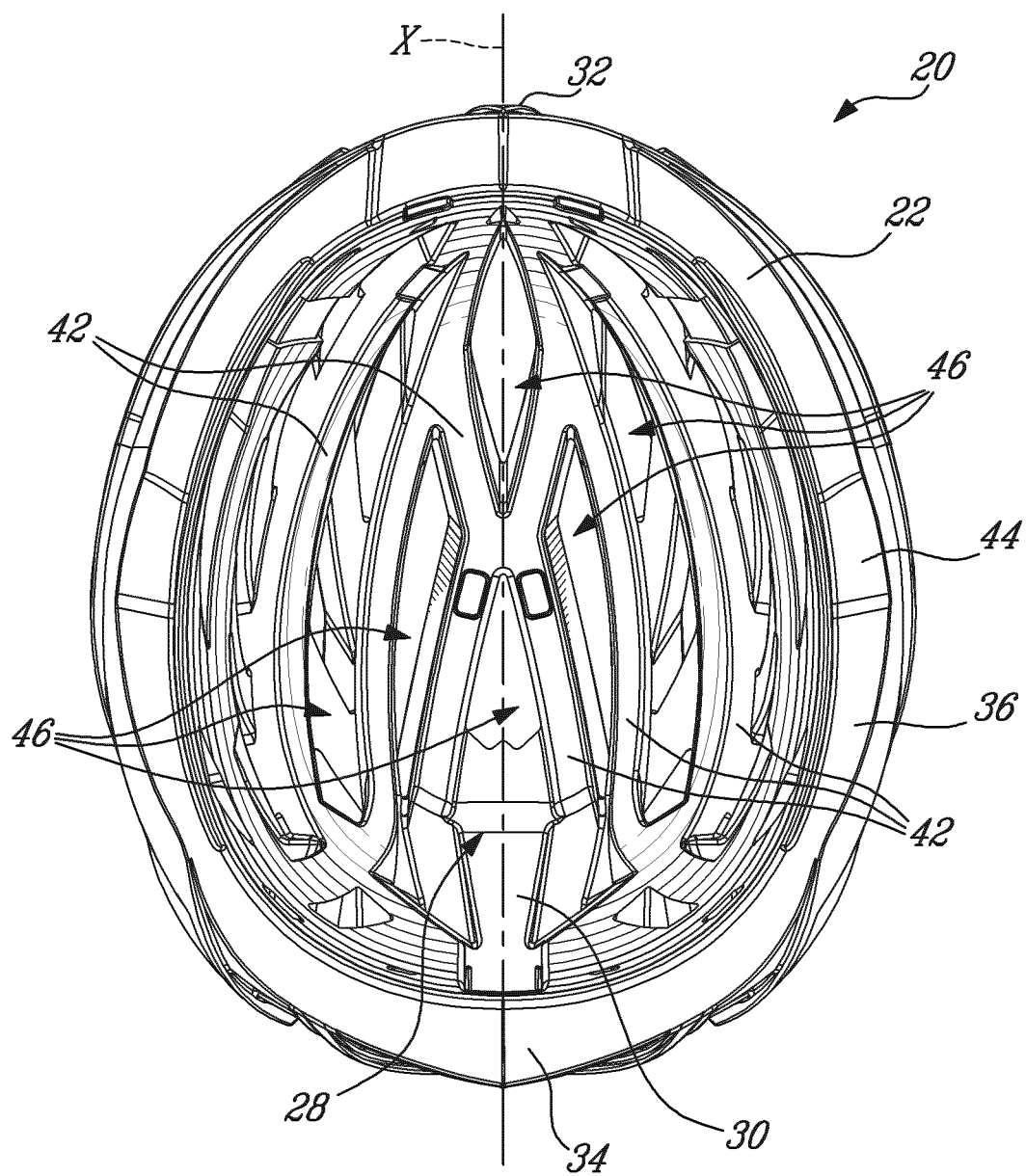
FIG. 6 is a bottom plan view of the protective helmet shown in FIG. 1.

Referring now to the figures and, more particularly, referring to FIGS. 1 to 6, there is shown an embodiment of a protective helmet 20, which is especially well suited for use as a bicycle helmet. In use the helmet 20 rests upon and covers the wearer's head.

The helmet 20 has a helmet body 22 which is a composite structure including an external shell 24 and a shock absorbing insert 26. The helmet body 22 makes up the protective, impact resistant portion of the helmet 20. The helmet body 22 has a substantially hemispherical shape with a cavity 28 sized to permit the body 22 to fit on the wearer's head and, more particularly, partially surrounds a portion of the wearer's head.

The shock absorbing insert 26 has a convexo-concave shape with a concave inner surface 30 configured to permit the helmet 20 to fit the wearer's head. As it will be described in more details below, it is made of a shock absorbing material that mitigates the force and provides protection to the wearer's head in case of impact.

The helmet body 22 has a front section 32, an opposed rear section 34, a bottom edge 36, and a top section 38. As used herein, the words "front", "rear", "right", "left", "top", "bottom", "upper", and "lower" are interpreted from the point of view of the wearer of the helmet 20. In the embodiment shown, the helmet body 22 is symmetrical about a longitudinal axis X (FIG. 5) extending from the front section 32 to the rear section 34 of the helmet 20. Thus, the left and right sides of the helmet body 22 are mirror images of each other. One skilled in the art will appreciate that in an alternative embodiment (not shown), the helmet body 22 is not symmetrical about the longitudinal axis X.

The external shell 24 is superposed outwardly and bonded to the shock absorbing insert 26. The external shell 24 covers at least a portion of the outer surface 40 of the shock absorbing insert 26. In the embodiment shown, the external shell 24 is continuous, however it is appreciated that in an alternative embodiment (not shown), it can be multi-pieces. As it will be described in more details below, the external shell 24 provides protection to the wearer's head by increasing the impact strength as well as improving the appearance of the helmet 20.

The helmet body 22 has a generally open convexo-concave structure defined by a plurality of interconnecting structural bridges 42 (or arms) extending generally longitudinally. The elongated structural bridges 42 are generally convexo-concave to conform to the shape of the wearers head. The structural bridges 42 are transversely spaced apart from one another, and directly or indirectly merge with an annular bottom edge rim 44 of the helmet body 22 at least one of their front and rear ends. The structural bridges 42 are bridges extending between the other structural bridges 42 and the other structural components of the helmet body 22, including the annular bottom edge rim 44.

Both the external shell 24 and the shock absorbing insert 26 include structural bridges 42. A majority of the structural bridges 42b of the shock absorbing insert 26 are covered by a respective one of the external shell structural bridges 42a when the external shell 24 is superposed thereto. Thus, a majority of structural bridges 42 of the shock absorbing insert 26 and the external shell 24 are in register as it will be described in more details below.

Ventilation openings 46 (or elongated vents) are formed in between each pair of successive structural bridges 42. The ventilation openings 46 are configured to allow air to flow therethrough to cool the wearer's head. In the embodiment shown, the ventilation openings 46 are elongated and are arranged generally in a longitudinal direction of the helmet body 22. The ventilation openings 46 are sized to direct a desired amount of airflow towards the wearer's head and allow perspiration to flow outwardly.

It is appreciated that the pattern of the structural bridges 42 and the ventilation openings 46 can vary from the one shown in the accompanying drawings and described above.

As shown in FIGS. 1 to 8, a majority of the structural bridges 42 have a base section 48 and an elongated ridge 50 protruding from the base section 48. The base section 48 and the elongated ridge 50 are defined in both the shock absorbing insert 26 and the external shell 24. The elongated ridges 50a, 50b of the external shell 24 and the shock absorbing insert 26 are in register, i.e. the ridge 50a of the external shell 24 overlays the ridge 50b of the shock absorbing insert 26. The elongated ridges 50 are generally centrally located relatively to the base section 48. In the embodiment shown, the elongated ridges 50 have a substantially trapezoidal cross-section. In a particular embodiment, the elongated ridges 50 have a substantially rectangular cross-section.

The elongated ridges 50a of the external shell 24 define a cavity 52 on the inner face 54 of the external shell 24 in which shock absorbing material is located, i.e. the elongated ridges 50b of the shock absorbing material are inserted in the cavity 52 defined by the elongated ridges 50a of the external shell 24.

The ridges 50 are narrower than the base section 48, i.e. the base section 48 extends laterally from the ridges 50.

In an embodiment, the elongated ridges 50 are substantially continuous along their respective structural bridges 42 and can interconnect with other elongated ridges 50 of adjoined structural bridges 42.

In the embodiment shown, for the structural bridge 42, the upper face of external shell 24 and the corresponding shock absorbing insert 26 has six edges. Thus, a cross-section of the structural bridges 42 define six corners and, more particularly four outside corners 56, 58 and two inside corners 60. Two of the outside corners 56 are defined at an upper end of the elongated ridge 50 while the other two outside corners 58 are defined in the base section 48 of the structural bridges 42. The two inside corners 60 are located at the junction of the elongated ridge 50 and the base section 48. The edges and corners 56, 58, 60 reinforce structurally the external shell 24 and the shock absorbing insert 26. They create a resistance to deformation due to impact as it will be described in more details below.

In the embodiment shown, the structural bridges 42 of the external shell 24 having an elongated ridge 50a have an upper ridge wall 62a extending between two ridge outside corners 56a, two spaced-apart substantially parallel ridge lateral walls 64a, two spaced-apart base upper walls 66a extending between the inside corners 60a and the base outside corners 58a on each side of the elongated ridge 50a and, finally two spaced-apart substantially parallel base lateral walls 68a extending downwardly from the base outside corners 58a.

Similarly, the structural bridges 42 of the shock absorbing insert 26 having an elongated ridge 50b have an upper ridge wall 62b extending between two ridge outside corners 56b, two spaced-apart substantially parallel ridge lateral walls 64b, two spaced-apart base upper walls 66b extending between the inside corners 60b and the base outside corners 58b on each side of the elongated ridge 50b and, finally two spaced-apart substantially parallel base lateral walls 68b extending downwardly from the base outside corners 58b.

The upper ridge wall 62b, the ridge outside corners 56b, the ridge lateral walls 64b, the base upper walls 66b, the inside corners 60b, the base outside corners 58b, and the base lateral walls 68b of the shock absorbing insert 26 are in register respectively with the upper ridge wall 62a, the ridge outside corners 56a, the ridge lateral walls 64a, the base upper walls 66a, the inside corners 60a, the base outside corners 58a, and the base lateral walls 68a of the external shell 24 overlying the shock absorbing insert structural bridge 42b. In other words, each section of the external shell structural bridge 42a covers a respective section of the shock absorbing insert structural bridge 42b.

Figure 7:
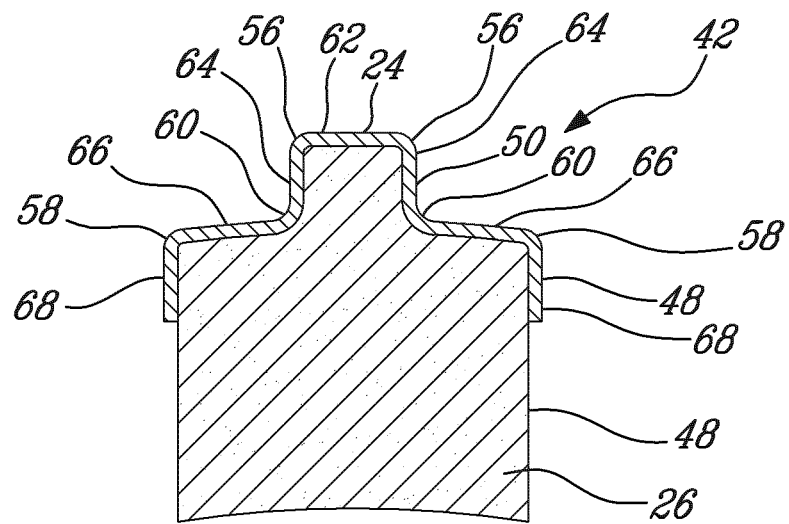
FIG. 7 is a cross-sectional view of one of the structural bridges of the protective helmet shown in FIG. 1.
Figure 8:
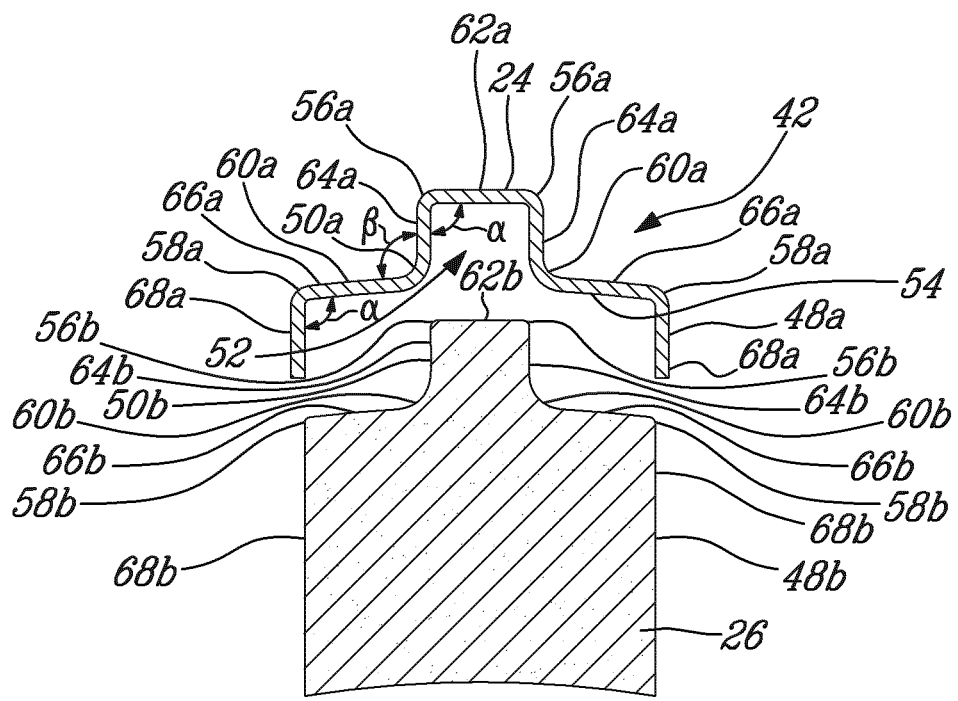
FIG. 8 is a cross-sectional view, exploded, of the structural bridge shown in FIG. 7.

As shown in FIGS. 7 and 8, sections of the external shell 24 and, more particularly, the base lateral walls 68a extend in the ventilation openings 46 defined between two consecutive structural bridges 42 of the shock absorbing insert 26 and cover a portion of the base lateral walls 68b of the shock absorbing insert 26. It is appreciated that in an alternative embodiment (not shown), the external shell 24 can be free of base lateral wall 68a and base outside corners 58a. In that particular embodiment, the external shell 24 includes two outside corners 56a and two inside corners 60a while the shock absorbing insert 26 includes four outside corners 56b, 58b and two inside corners 60b. Furthermore, one skilled in the art will appreciate that the length of the base lateral walls 68a of the external shell 24 can vary, i.e. it can cover either partially or entirely the base lateral walls 68b of the shock absorbing insert 26.

In an embodiment, the inside and outside corners 56, 58, 60 define angles $\alpha$, $\beta$ ranging between 90 and 135 degrees and in another embodiment, the inside and outside corners 56, 58, 60 define angles $\alpha$, $\beta$ ranging between 90 and 120 degrees. In a particular embodiment, the angles $\alpha$, $\beta$ defined by the inside and outside corners 56, 58, 60 are approximately right (90°) angles. One skilled in the art will appreciate that the angles $\alpha$ for the outside corners 56, 58 can be different from one another.

Figure 10:
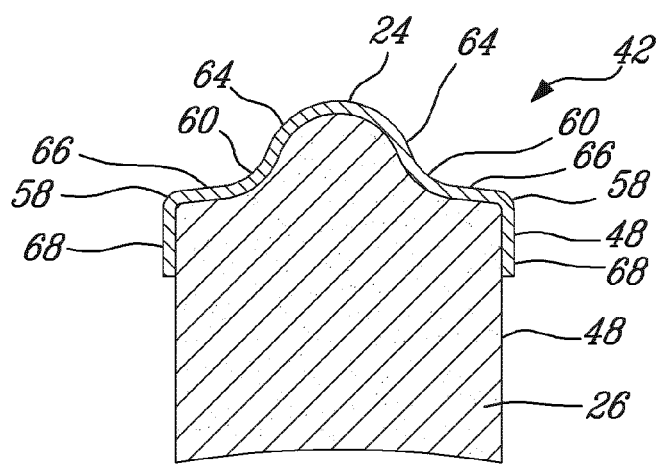
FIG. 10 is a cross-sectional view of a structural bridge of a protective helmet in accordance with another embodiment wherein ridges have a curved shape.

In the embodiment shown in FIGS. 7 and 8, the upper ridge wall 62 of the elongated ridge 50 is substantially flat and extends substantially parallel to the base upper walls 66. However, it is appreciated that in alternative embodiments such as the one shown in FIG. 10, it can have a substantially rounded shape, therefore, the outside edges corresponding to the outside corners 56 can have a substantially round shape, i.e. the adjoining surfaces do not meet along a well-defined edge. In an alternative embodiment (not shown), the elongated ridge 50 can have a substantially triangular cross-section with two diagonally extending ridge lateral walls. In this particular embodiment, the elongated ridge 50 has only one ridge outside edge and corner and is free of upper ridge wall. In another embodiment, the elongated ridge 50 has a substantially trapezoidal shape.

To provide sufficient structural strength to the helmet body 22 in case of impact, a majority of the length of the structural bridges 42 has elongated ridges 50 protruding therefrom. For instance and without being limitative, if the total length of all structural bridges 42 of the helmet body 22 is about 100 cm, excluding the bottom edge rim 44, elongated ridges 50 protrude along at least 50 cm of the structural bridges 42. Furthermore, the elongated ridges 50 are mainly located in the frequently impacted sections of the helmet body 22 such as and without being limitative, close to the helmet top section 38.

In the embodiment shown, the elongated ridges 50 extend upwardly from and along about 80% of the total length of the structural bridges 42, excluding the annular bottom edge rim 44. To provide structural rigidity to the helmet body 22, the elongated ridges 50 protrude from the structural bridges 42 located in frequently impacted sections. In another embodiment, more than 90% of the total structural bridge length has elongated ridges 50 protruding therefrom.

In an embodiment, the shock absorbing insert 26 is manufactured from an energy absorbing material such as expanded foam material. However, it is appreciated that other material can be used. In an embodiment, the density of the energy absorbing material can vary within the various helmet sections. In another embodiment, the shock absorbing insert 26 can have a generally uniform material density.

In an embodiment, the external shell 24 is made of a relatively thin layer of a plastic material such as, for instance and without being limitative, polycarbonate. Its average thickness is substantially less than the average thickness of the shock absorbing insert 26. For instance and without being limitative, the average thickness of the external shell 24 can range between 0.5 and 1 mm and, in an alternative embodiment, the average thickness of the external shell 24 ranges between 0.7 and 0.8 mm.

The elongated ridges 42a protruding from the structural bridges 42a and the plurality of outside and/or inside edges and corners 56a, 58a, 60a provide structural strength to the external shell 24. The elongated ridges 42a including the edges corners 56a, 58a, 60a rigidify the external shell 24 as well as having an impact strength. When superposed to the shock absorbing insert 60, the compression resistance of the helmet body 22 when impacted is improved in comparison with a helmet including solely a shock absorbing insert. In other words, it provides an exoskeleton to the helmet body 22. Therefore, the shock absorbing insert 26 can be free of reinforcing frame which are typically embedded therein. Furthermore, the elongated ridges 42a defined in the external shell 24 provide structural homogeneity to the helmet. The external shell 20 has sufficient structural strength to substantially maintain its shape without the shock absorbing insert 26.

Since the elongated ridges 50 protrude from the base section 48, upon the wearer's head accidentally impacting on the ground or any other hard impact surface, a first blow will be sustained by the elongated ridges 50, wherein some kinetic energy will be dissipated into the shock absorbing material located in the cavity 52 of the elongated ridges 50. Then, either upon a second impact of the wearer's head against ground or other impact surface or due to a first strong impact force, the kinetic energy will further dissipate into the remaining sections of the shock absorbing insert 26. Progressive stepwise kinetic impact energy absorption from successive impact blows or strong impact blows sustained by the helmet body 22 is achieved by compression of the shock absorbing material and deformation of the external shell, without compromising the head-shielding properties of the helmet body 22. The helmet body design including the elongated ridges 50 allows the deceleration of the impact surface when hitting the helmet body 22, i.e. it gradually slowers the impact object.

Tests showed that the helmet body 22 has a substantially similar impact resistance than a helmet body having shock absorbing insert structural bridges with a substantially rectangular cross-section of a height corresponding to the height of the combination of the base section 48 and the elongated ridge 50. However, the helmet body 22 with the elongated ridge design has a lower weight. The helmet structural design has an impact resistance which can respect the ASTM norms and which lowers the helmet weight in comparison with the helmets including structural reinforcing elements embedded within the shock absorbing insert 26.

In the embodiment shown in FIGS. 1 to 10, helmets lighter than 200 grams can be manufactured.

Figure 9:
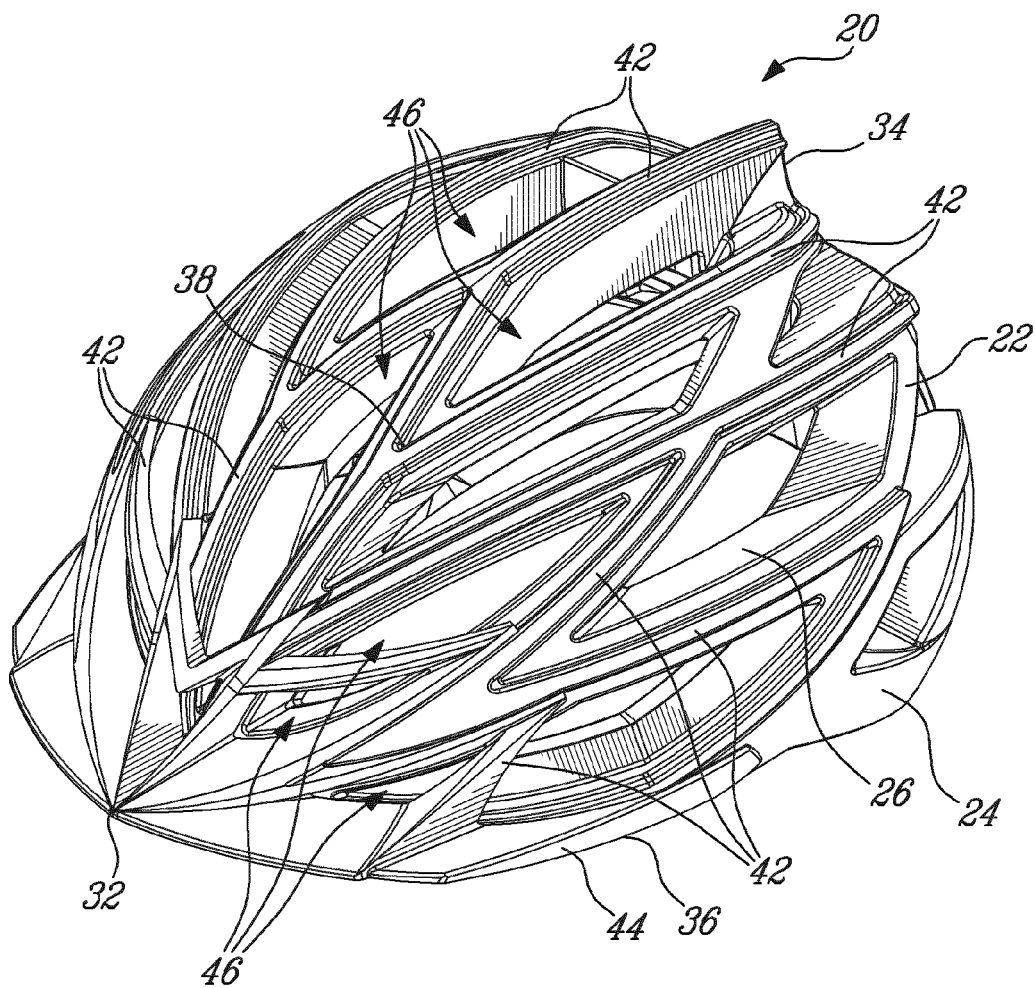
FIG. 9 is a perspective view of a protective helmet in accordance with another embodiment.

It is appreciated that in alternative embodiments such as the non-limitative embodiment shown in FIG. 9, the pattern of the structural bridges 42 can vary from the one shown in the above described embodiment. For instance and without being limitative, the structural bridges 42 can extend along irregular, straight, arcuate, wavy, sinusoidal patterns or any combination thereof. In the embodiment shown, the structural bridges 42 extend generally longitudinally along the helmet body 22. However, it is appreciated that in alternative embodiments (not shown), the structural bridges 42 can extend generally transversally along the helmet body 22 or in a combination of transversal and longitudinal orientations. It is appreciated that the ridges 50 generally extend substantially in the same orientation than their respective structural bridge. One skilled in the art will appreciate that the ridges are not compulsorily centered on the structural bridges 42.

The width of the structural bridges 42 and the width of the elongated ridges 50 can vary. For instance and without being limitative, the width of the structural bridges 42 can range between 8 and 20 mm, in an alternative embodiment, the width can range between 10 and 15 mm, and in still a further alternative embodiment, the width is about 8 mm. For instance and without being limitative, the width of the elongated ridges 50 at an upper end can range between 2 and 7 mm, in an alternative embodiment, the width can range between 3 and 5 mm, and in still a further alternative embodiment, the width is about 4 mm.

Similarly, the height of the elongated ridges 50 can vary. For instance and without being limitative, the height of the elongated ridges 50 can range between 2 and 8 mm and in an alternative embodiment, the width can range between 3 and 6 mm. It is appreciated that the height and the width of the elongated ridges 50 can vary along their respective structural bridges 42 and that a helmet body 22 can include elongated ridges 50 of various heights and widths.

The helmet body 22 can be manufactured in a mold having two portions: a top portion and a bottom portion. The top portion defines the outer surface of the helmet body 22 while the bottom portion defines the inner concave portion. The external shell 24 is inserted in the top portion and, more particularly, is superposed to the bottom surface of the top portion. The bottom portion is superposed to the top portion and the shock absorbing material is injected into the mold. In an alternative embodiment, the external shell 24 can be injection molded onto the helmet body 22 after it has been formed in a previous molding step.

It is appreciated that the size of the helmet body 22 can vary to fit the variety of headsizes in the wearer population. For instance, the helmet body 22 can be sized to fit either children or adult heads.

In the above described embodiments, the structural bridge design is used in combination with a cycling helmet. However, it is appreciated that the structural bridge design can be used for several types of helmets where impact resistance is required.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is:

1. A bicycle helmet having a helmet body including a shock absorbing insert having a concave side and a convex side, and an external shell superposed to and at least partially covering the convex side of the shock absorbing insert, the helmet body having a plurality of interconnected structural bridges, at least some of the structural bridges extending in a direction defined from a front section of the bicycle helmet to a rear section of the bicycle helmet, said at least some of the structural bridges extending continuously along ventilation openings from front to rear of the bicycle helmet, a majority of the structural bridges each comprising:
   a base section defined by material of the shock absorbing insert and material of the external shell covering at least a portion of the base section, the base section having a base wall on the convex side elongated to continuously span the entire full length of at least one of the ventilation openings from front to rear of the bicycle helmet; and
   an elongated ridge defined by the material of the shock absorbing insert and the material of the external shell covering at least a portion of the elongated ridge, the elongated ridge protruding upwardly from the base wall and extending concurrently with the base section, from the base wall, from front to rear of the bicycle helmet, the elongated ridge extending along the base section from the top of the base wall to continuously span the entire full length of at least one of the ventilation openings.

2. A bicycle helmet as claimed in claim 1, wherein at least 60% of a length of the structural bridges have elongated ridges protruding from the base sections.

3. A bicycle helmet as claimed in claim 1, wherein the external shell and the shock absorbing insert are bonded together.

4. A bicycle helmet as claimed in claim 1, wherein at least one of the structural bridges including one of the elongated ridges comprises at least two inside corners defined between the one of the elongated ridges and the corresponding one of the base sections and at least one outside corner.

5. A bicycle helmet as claimed in claim 1, wherein at least one of the structural bridges including one of the elongated ridges comprises two inside corners defined between the one of the elongated ridges and the corresponding one of the base sections, at least one ridge outside corner, and two base outside corners.

6. A bicycle helmet as claimed in claim 1, wherein at least one of the structural bridges including one of the elongated ridges comprises two inside corners defined between the one of the elongated ridges and the corresponding one of the base sections, two ridge outside corners, and two base outside corners.

7. A bicycle helmet as claimed in claim 1, wherein the elongated ridges each comprise base lateral walls projecting upwardly from the base wall.

8. A bicycle helmet as claimed in claim 4, wherein the inside and the outside corners define an angle ranging between 90° and 135°.

9. A bicycle helmet as claimed in claim 1, wherein the structural bridges are one of directly connected and indirectly connected to an annular bottom edge rim of the helmet body.

10. A bicycle helmet as claimed in claim 1, wherein the majority of the elongated ridges is centrally located on a respective one of the base sections.

11. A bicycle helmet as claimed in claim 1, wherein the elongated ridges of adjoined ones of the structural bridges are connected to one another.

12. A bicycle helmet as claimed in claim 1, wherein the elongated ridges have a substantially trapezoidal cross-section.

13. A bicycle helmet as claimed in claim 1, wherein the cross-section of the elongated ridges comprise a substantially flat upper ridge.

14. A bicycle helmet as claimed in claim 1, wherein the elongated ridges have a width ranging between about 2 millimeters to 7 millimeters and a height ranging between about 2 millimeters to 8 millimeters.

15. A bicycle helmet as claimed in claim 1, wherein the elongated ridges have a width to height ratio substantially equal to 1.

* * * * *